United States Patent [19]

Osborne et al.

[11] 4,001,559
[45] Jan. 4, 1977

[54] PROGRAMMABLE MEASURING

[75] Inventors: Deane C. Osborne; John M. Harrison, both of Epsom; Alfred K. Hillman, Jr., Suncook, all of N.H.

[73] Assignee: Northern Telecom, Inc., Waltham, Mass.

[22] Filed: Dec. 16, 1974

[21] Appl. No.: 532,746

[52] U.S. Cl. .................. 235/151.31; 179/175.3 R; 340/146.1 E; 444/1
[51] Int. Cl.[2] .................. G08C 25/00; G06F 15/20
[58] Field of Search .................. 235/151.3, 151.31; 340/146.1 E; 179/175.2 C, 175.21, 175.3 R, 15 AL, 175.31 R; 178/69 R, 69 A; 144/1

[56] References Cited
UNITED STATES PATENTS

| | | | |
|---|---|---|---|
| 3,496,536 | 2/1970 | Wheeler et al. | 340/146.1 E |
| 3,787,810 | 1/1974 | Wiggins et al. | 340/146.1 E |
| 3,819,878 | 6/1974 | Pine et al. | 179/175.3 R |
| 3,842,218 | 10/1974 | DeLuca | 179/175.3 R |
| 3,875,500 | 4/1975 | Fletcher et al. | 178/69 A X |

*Primary Examiner*—Jerry Smith
*Attorney, Agent, or Firm*—Charles Hieken; Jerry Cohen

[57] ABSTRACT

A communications line under test intercouples programmable local units, one of which transmits an analog waveform to the other in response to digital control signals received from a computer. The receiving programmable local unit transmits a digital signal to the computer representative of the received analog signal to thereby enable the computer to determine transmission characteristics of the communications line intercoupling the programmable local units.

13 Claims, 14 Drawing Figures

PROGRAMMABLE MEASURING

BACKGROUND OF THE INVENTION

The present invention relates in general to programmable measuring and more particularly concerns novel apparatus and techniques for rapidly and automatically testing the transmission characteristics of a communications channel that may be remote from a central computer through measuring analog test signals transmitted over the channel while communications between the central computer and the terminal points of the channel under test are through reliable digital signals to enable the digital computer to readily determine the transmission characteristics of the communications channel under test.

A typical prior approach to checking a communications channel comprises a local computer in a closed loop including the communications channel to be tested. Having a digital computer for each communications link is costly, for a typical communications system has many links.

Accordingly, it is an important object of this invention to provide apparatus and techniques that facilitates using one digital computer to automatically measure transmission characteristics of a number of communication links in a communications system.

It is a further object of the invention to achieve one or more of the preceding objects with programmable local units that are relatively inexpensive and reliable.

It is a further object of the invention to achieve one or more of the preceding objects with programmable local units characterized by a high degree of flexibility and capable of functioning both to receive and transmit test signal waveforms and to accept digital command signals from the computer and provide digital signals to the computer relevant to the programmable measurements being made.

It is a further object of the invention to provide novel apparatus and techniques for providing a wide variety of waveforms.

It is a further object of the invention to provide a programmable local unit having both a digital signal input and a digital signal output for communication with a digital computer and an analog input and analog output for exchanging signals with a communication link to be tested.

It is still a further object of the invention to provide novel shift register techniques for generating analog waveforms.

It is still a further object of the invention to provide shift register techniques for converting a received analog signal into corresponding digital signals.

It is still a further object of the invention to achieve one or more of the preceding objects while controlling signal gain to keep signal levels so as to obtain substantially maximum resolution.

SUMMARY OF THE INVENTION

According to the invention, there is a central digital computer that transmits digital signals to a programmable local unit at an end of a communication channel to be tested. A programmable local unit includes means responsive to the digital signal from the digital computer for providing an analog signal waveform for transmission over the communication channel under test and means responsive to the received test analog signal transmitted over the communications link for converting the received signal into a representative digital signal that is transmitted to the digital computer to enable the latter to determine the transmission characteristics of the communications link under test.

A local unit according to the invention includes generally buffer means for storing a sequence of digital numbers representative of a signal waveform to be transmitted over the communications link to be tested, digital-to-analog converting means coupled to the generator buffer means for converting the digital signal provided by the generator buffer means into a corresponding analog signal and output level control means for controlling the amplitude of the latter analog signal to a predetermined level for transmission over the communications link to be tested that is delivered to line interface means for exchanging signals with the local unit and the communications link under test. The local unit also includes input level control means for controlling the amplitude of a signal provided by the communications link under test to a predetermined level, analog-to-digital converting means responsive to the latter signal of controlled level for providing a representative digital signal, and receiving buffer means for storing the latter digital signals as a sequence of digital numbers representative of the signal received over the communications link for transmission to the remote computer. The local unit also includes microprocessor control means for controlling the levels, the conversions between analog and digital form and receiving appropriate instructions from the remote computer to load a desired signal waveform into the generator buffer means and to unload a digital representation of the received waveform from the receiving buffer means for transmission back to the remote computer.

A feature of the local unit is that it has means for exchanging digital signals representative of analog signal waveforms transmitted over a communications link under test and means for exchanging these analog signal waveforms with the communications link under test.

A more specific feature of the invention is the form of the generator and receiving buffer means. Each typically comprises a plurality of shift registers that exchange digital number signals representative of analog signal waveforms in parallel at one end and exchange digital number signals serially representative of an analog signal waveform at the other end.

Still another feature of the invention is the use of digital automatic gain control means for adjusting the input level to obtain maximum resolution of the analog signal with the available bits for digital conversion, the means including a switched gain amplifier with negligible phase shift.

Numerous other features, objects and advantages of the invention will become apparent from the following specification when read in connection with the accompanying drawing in which:

DETAILED DESCRIPTION OF PREFERRED EMBODIMENTS

Figure 1:
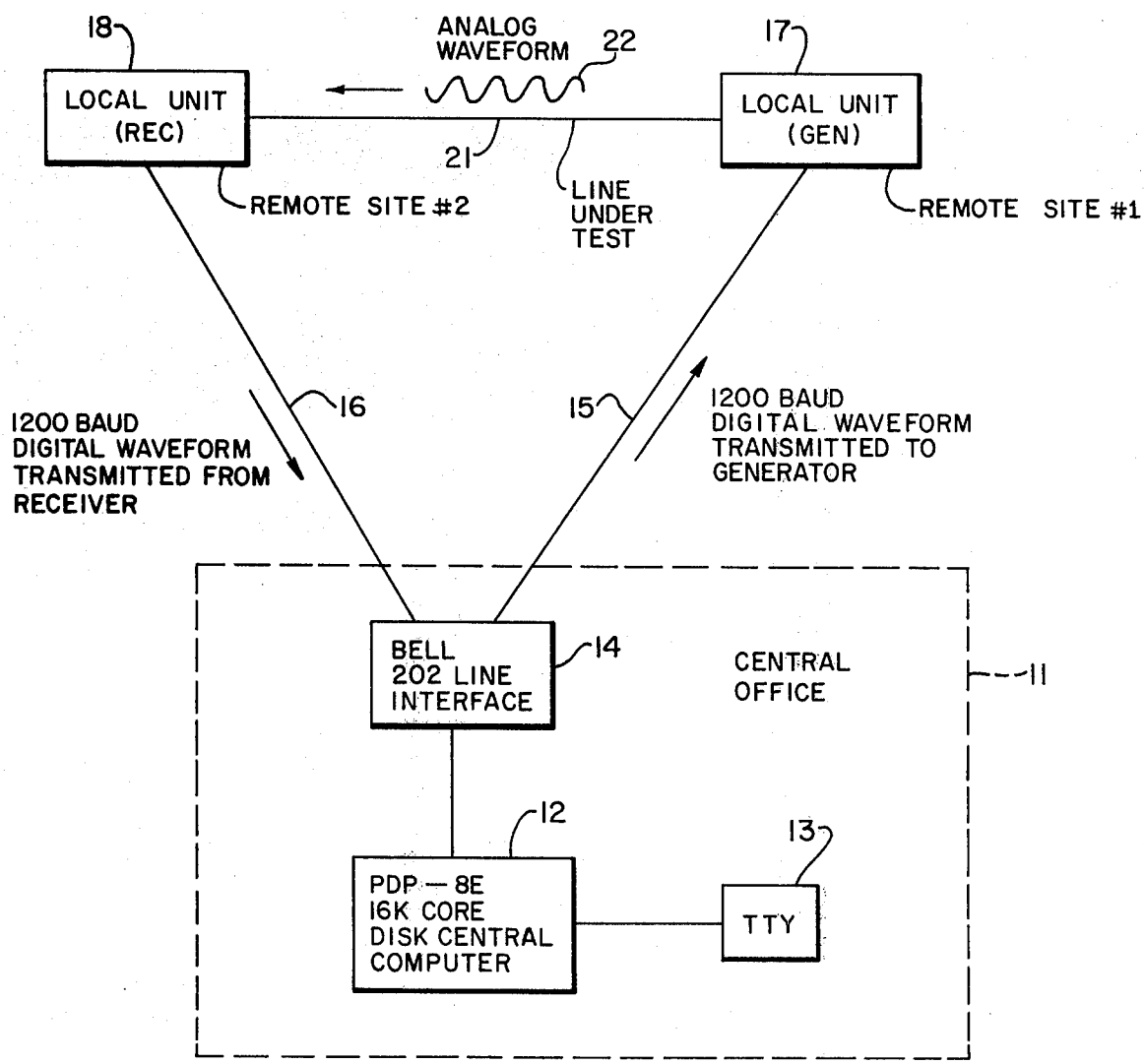
FIG. 1 is a block diagram illustrating the logical arrangement of a system according to the invention.

With reference now to the drawing and more particularly FIG. 1 thereof, there is shown a block diagram illustrating the logical arrangement of a system according to the invention. A central office 11 includes a central computer, such as a Digital Equipment Corporation PDP-8E having a 16K bit core memory and disc coupled to a conventional teletypewriter 13 for accepting information on tests to be made and printing out the results of the test. Central computer 12 is coupled to telephone lines through line interface 14, such as Bell 202 data sets. Telephone lines 15 and 16 intercouple central office line interface 14 with local units 17 and 18, respectively, intercoupled by line 21 under test.

In the example local unit 17 is indicated as functioning as a generator that transmits analog waveform 22 over line 21 to local unit 18 functioning as a receiving unit for the analog waveform 22. However, it is within the principles of the invention for each local unit to function as one or both of transmitting and receiving units. For example, it is within the principles of the invention to transmit the analog waveform 22 from remote site number 1 to remote site number 2 and back to remote site number 1 with local unit 17 functioning as both transmitter and receiver so that line 21 could be tested with but a single communication link between central office 11 and remote site number 1.

Having discussed the physical arrangement of a system according to the invention, its mode of operation will now be discussed. An operator enters on teletype 13 information on the test to be performed, the line to be tested and the local unit or units to be used in the tests. The test to be performed may be those useful in checking a particular communications link. For example, typical measurements made on a telephone line include loss, frequency shift, phase jitter, single tone interference, and C-notched noise using a 1015.625Hz tone. Other measurements typically made include those of second and third intermodulation distortions using the sum of three tones, attenuation and delay distortions using a spectrum filling signal and C-message noise using a quiet termination. The specific tests are not a part of the invention and are by way of example in connection with illustrating the best mode now contemplated for practicing the invention.

Typically, the test might be a frequency response test to determine attenuation distortion and delay distortion at specified impedance levels, typically 600 ohms. With local unit 17 identified as the generator and local unit 18 identified as the receiving unit, each receives digital signals over lines 15 and 16, respectively, that readies each to perform its desired function. Thus, local unit 17 proceeds to transmit a spectrum of tones over line 21 that is received by local unit 18 which then transmits a digital representation of the signal waveform over line 16 to central computer 12 through interface 14 so that central computer 12 may process the digital representation and print out on teletype 13 test results, typically listing each frequency of the transmitted spectrum followed by the attenuation at that frequency and the delay at that frequency. The specific techniques, such as fast Fourier transform methods, for processing digital representations of measurements received at different frequencies to print out a frequency response are well-known in the digital computer art, are not a part of the invention and are not described in detail herein so as to avoid obscuring the principles of the invention.

In a typical frequency response measurement the local unit transmits digital samples of the received waveform to the central computer representative of a voltage waveform as a function of time in the time domain similar to what would be observed using an oscilloscope. The central computer uses a Fast Fourier Transform algorithm to convert the samples to amplitude and phase as a function of frequency in the frequency domain to represent the received waveform by its spectral components. The computer subtracts the received amplitude from the transmitted amplitude at each frequency to determine attenuation and takes the derivative of the phase response with respect to frequency to determine delay. These methods are well-known in the digital signal analysis field.

Figure 2:
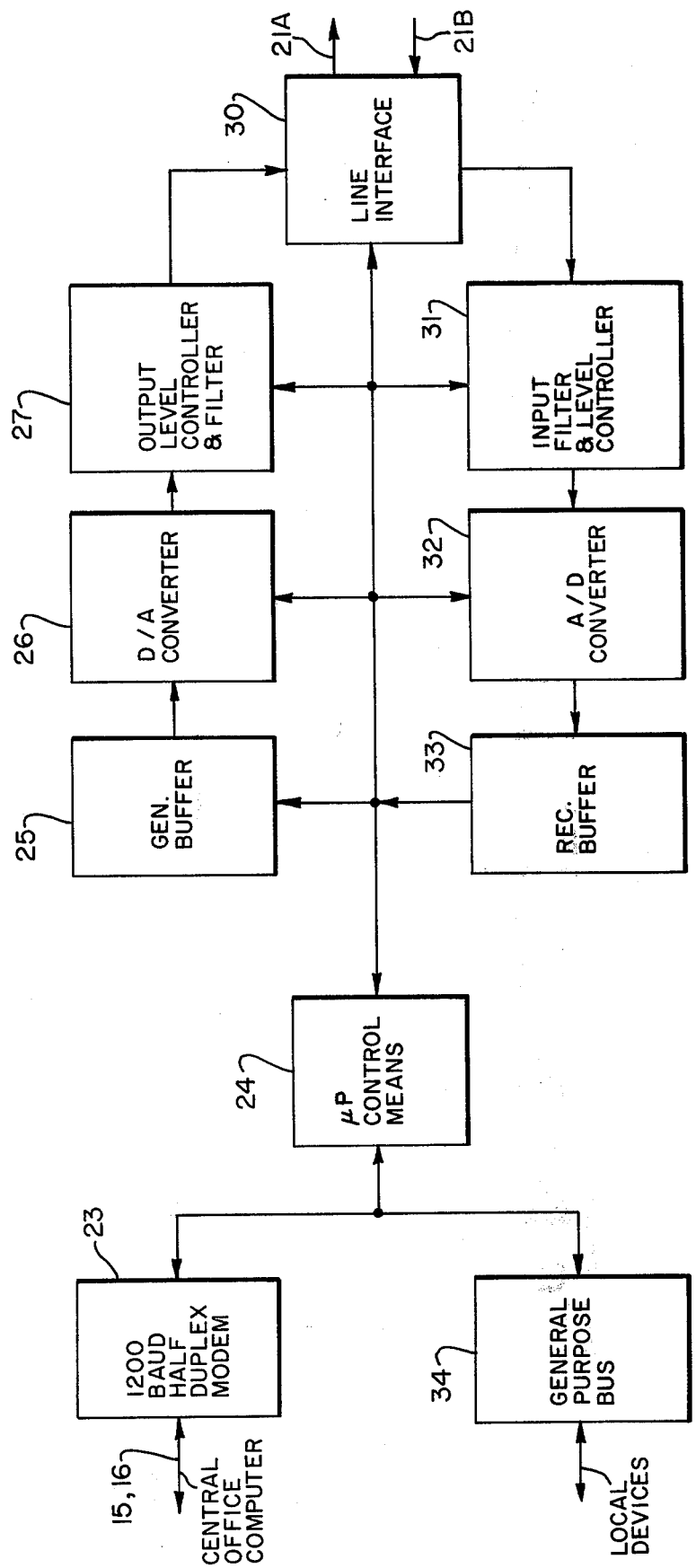
FIG. 2 is a block diagram illustrating the logical arrangement of a local unit according to the invention.

Referring to FIG. 2, there is shown a block diagram illustrating the logical arrangement of an exemplary embodiment of a local unit according to the invention. The local unit includes a 1200 baud half duplex modem 23 for interfacing with the telephone lines to the central office, such as 15 or 16, for exchanging digital data signals therewith at a 1200 baud rate. A microprocessor control means 24 exchanges digital data with modem 23 and signals with the other elements of the local unit. The local unit includes a generator buffer 25 for receiving a sequence of digital numbers representative of a waveform to be transmitted over test line 21, a digital-to-analog converter 26 for converting the sequence of digital numbers provided by generator buffer 25 and an output filter, output level controller 27 for controlling the level of the analog signal for transmission over test line 21 and a line interface 30 for coupling the test signal from output level controller 27 to line 21 and coupling a signal received from line 21 to input filter and input level controller 31 in the receiving branch of the local control unit. The receiving portion of the local unit also includes an analog-to-digital converter 32 for converting the received analog signal of controlled level into a sequence of digital number signals that are entered parallelly in receiving buffer 33. Receiving buffer 33 provides a sequence of digital numbers to the central office through modem 23 under the control of microprocessor control means 24.

The local unit may also include a general purpose bus 34 for exchanging data with local apparatus at the location of the local control unit, such as a local computer, keyboard/display, digital voltmeter, other instruments or RAM or ROM storage means.

Having briefly described the physical arrangement of the local unit, its mode of operation will now be discussed. 1200 baud half duplex modem 23 is capable of interfacing with any computer and receives commands and generator sequences from the computer for transmission over test line 21 while sending results of commands and samples in digital form of a test signal received on test line 21 to the central office computer. Preferably these digital signals are as ASCII code with odd parity.

Microprocessor control means 24, typically an Intel MCS-4 integrated circuit, accepts commands from modem 23 or general purpose bus 34 and decodes and executes these commands. A list of the commands are set forth below. The specific means for decoding and executing commands are well-known in the art and not described in detail to avoid obscuring the principles of the invention.

When the local unit is functioning in the transmit mode, generator buffer 25, typically capable of storing 512 12-bit digital words, receives a sequence of 12-bit words through control means 24 and modem 23, the digital data entering in byte form. Microprocessor control means 24 then causes generator buffer 25 to be cycled typically at an 8000 Hz rate to provide parallel access to each 12-bit digital number signal for conversion by digital-to-analog converter 26 into a representative amplitude level that is controlled by output level controller 27 under the control of microprocessor control means 24 to provide on line 21 the test signal.

For testing typical telephone lines the filter portion of output level controller and filter 27 is typically flat to 3000 Hz, 3dB down at 3200 Hz and 60dB down at 8000 Hz, the cycling rate.

Line interface 30 may include switching relays for effecting appropriate connections to transmit terminal 21A and receive terminal 21B of line 21. For example, the switching relays may switch in an appropriate terminating impedance, typically 600 or 900 ohms, a quiet termination for measuring quiescent noise or effect a loop around wherein the test signal is received on input 21B and retransmitted on output 21A with loss or gain in level so that all communication with the central office computer may be essentially with one local unit.

A received signal through line interface 30 is typically applied to input filter and level controller 31, typically filtered, in accordance with similar transmission characteristics described above in connection with output level controller and filter 27. Level controller 31 typically amplifies the received input signal to a maximum of 60dB in 4dB increments to insure better than 11-bit resolution. This amplification is preferably accomplished automatically so that the maximum level provided at the input to analog-to-digital converter 32 corresponds to the largest value of a 12-bit binary number. This may rapidly be accomplished automatically by initially setting the amplification at 60dB and decreasing the amplification in steps until this maximum digital number value is provided by analog-to-digital converter 32.

Analog-to-digital converter 32 converts the filtered input signal into 12-bit samples at an 8000 Hz rate that are stored in receiving buffer 33. Microprocessor control means 24 then effects the transfer of the digital numbers stored in receiving buffer 33 in byte form through modem 23 to the central office computer. Since the central office computer then has a digital representation of both the transmitted test signal and the corresponding received signal, well-known techniques may be used to digitally evaluate transmission characteristics of the line, such as frequency response, distortion and noise level. The specific techniques for performing these evaluations digitally are well-known in the digital computer art, are not a part of this invention and are not described in detail here to avoid obscuring the principles of the invention.

There follows a list of typical commands to the local unit and responses from the local unit together with appropriate designations on a conventional keyboard that may be used for designating these commands, the nature of the command and whether it is an immediate or string command. The significance of the commands will then be described.

| | COMMANDS | | |
|---|---|---|---|
| Load Waveform | 1 | | Two Character Immediate |
| (s)Second Character | = From | | Where to Load |
| Assigned Where s | = M | | Modem |
| | R | | Receiver Buffer |
| | 0–15 | | ROM/RAM On GP Bus |
| Send Samples | 2 | | Two Character Immediate |
| Second Character | & = | | Where to Send |
| Assigned Where s | = M | | Modem |
| | T | | Transmitter Buffer |
| | 0–15 | | ROM/RAM on GP Bus |
| Start String | 3 | | One Character Immediate |
| String Enable | 4 | | One Character Immediate |
| Retransmit | 5 | | One Character Immediate |
| Conditional End I/O | 6 | | One Character Immediate |
| Identify | 7 | | One Character Immediate |
| Stop Generator | = | | One Character Immediate |
| Self Test | > | | One Character Immediate |
| Bus Clear | ? | | One Character Immediate |
| Start I/O | CR | | Two Character Immediate |
| Second Character | = | | Local Unit Address |
| End I/O | NAK(ERR) | | One Character Immediate |
| Abort | BS(FEO) | | One Character Immediate |
| Set Output Level | 0 | | Two Character String |
| Second Character | = | | Six Bit ASCII Word Giving |
| Amount to Decrease Output From Maximum (Most Significant Bit) MSB= –32DB, –16DB, –8DB, –4DB, –2DB, –1DB = LSB (Least Significant Bit) | | | |
| Generate | G | | Two Character String |
| Second Character | = | | Six Bit ASCII Word Giving |
| Number of Sample Periods as Length of Generate Time @ = Generate Indefinitely | | | |
| Adjust AGC | A | | One Character String |

-continued

COMMANDS

| | | |
|---|---|---|
| Set Input Gain | I | Two Character String |
| Second Character | = | Six Bit ASCII Word |
| Giving Input Gain | | |
| MSB = +32DB, +16DB, +8DB, +4DB, X, X = LSB | | |
| Sample | S | One Character String |
| Line Configuration | L | Two Character String |
| Second Character | = | Six Bit ASCII Giving New |
| Line Configuration | MSB= | Input Relay, Bridge, |
| Loop, 600–900SZ, Output Relay, Modem = LSB | | |
| Delay | D | Two Character String |
| Second Character | = | Six Bit ASCII Giving |
| Number of Sample Periods to Delay | | |
| @= No Delay | | |
| End String | E | One Character String |
| Interrupt | M | Two Character String |
| Second Character | = | Data For GP Bus With IRT |
| Active | | |
| Universal Bus Command | U | Two Character String |
| Second Character | = | Least Significant Five Bits |
| Are Universal Bus Command | | |
| Begin Bus Data | B | One Character String |
| Finish Bus Data | @ | One Character String |

The commands are classified as immediate and string. An immediate command is one that is executed immediately upon receipt by the local unit. String commands are stored in random access memory comprising microprocessor control means 24 and executed sequentially after the End I/O command.

We turn now to a discussion of the specific commands.

The LOAD WAVEFORM command is typically designated by pressing the 1 key followed by a second character designating from where to load. Thus, pressing M selects the modem as the source of a digital representation of the test waveform for storage in generator buffer 25, pressing R selects receiver buffer 33 as the source and pressing numbered keys from 0–15 select specific ones of waveforms that may be locally stored in a random access memory or read only memory at the location of the local unit through general purpose bus 34.

The SEND SAMPLES command is selected by pressing 2 followed by a character designating where to send to samples, M for the modem, T for the generator buffer 25 and 0–15 for a designated one of random access or read only memories through general purpose bus 34.

Pressing 3 designates the START STRING COMMAND to cause the local unit to store the following commands as string commands. Pressing 4 selects the STRING ENABLE command to condition the local unit to enable a previously stored string.

Pressing 5 causes the local unit to retransmit its last response to the computer.

Pressing 6 implements CONDITIONAL END I/O whereby digital communication stops and no string is executed.

Pressing 7 implements IDENTIFY for directing the local unit to command devices on the GP Bus to identify themselves.

Pressing = implements the STOP GENERATOR command for ending the transmission of a test signal.

Pressing > implements the SELF TEST command whereby the local unit may perform a self testing routine to insure proper operation.

Pressing ? implements BUS CLEAR command to terminate the data transmissin on the GP bus.

Pressing CR followed by a local unit address designation implements the START I/O command for establishing communication with the local unit to receive appropriate commands.

Pressing NAK implements the END I/O command for ending this exchange and executing any enabled string.

Pressing BS implements the ABORT command which causes the local unit to abort the immediate command then being executed.

Pressing O followed by a second character that is a 6-bit ASCII word designating the amount to decrease the output from maximum by −32, −16, −8, −4, −2 and −1DB from the most significant to the least significant bit, respectively, and effect the setting of output level controller 27 accordingly.

Pressing G followed by a 6-bit ASCII word giving the number of sample periods as the length of the generation time effects the GENERATE string command that causes the waveform stored in generator buffer 25 to be provided on test line 21 for the designated period, pressing@following G causing the waveform to be generated indefinitely until a stop generator command.

Pressing A selects the AGC string command that causes the level setting of level controller 31 to maximize the resolution as described above. Pressing I followed by a second character in 6-bit ASCII implements the SET INPUT GAIN command that sets the level of input level controller 31 to a level designated by the following ASCII word with the sixth through third bits designating +32DB, +16DB, +8DB and +4DB increments of gain.

Pressing S implements the SAMPLE string command which causes the received signal to be converted into digital form and stored in receiver buffer 33.

Pressing L followed by a 6-bit ASCII character implements the LINE CONFIGURATION command to control the relays in line interface 31 to establish the various connections and terminations described above.

Pressing D followed by a second character in 6-bit ASCII code identifies a number of sample periods to delay before executing the next string command while pressing@produces no delay.

Pressing E implements the END STRING command, thereby signifying the end of a group of string commands and returning the local unit to immediate mode.

Pressing M followed by a second character addresses devices on the general purpose bus with IRT active.

Pressing U followed by a second character implements an UNIVERSAL BUS COMMAND for the general purpose bus 34. Pressing B implements the BEGIN BUS DATA as a one character string to cause the following data in the string to be appled to the general purpose bus 34, and pressing @ implements the FINISH BUS DATA command that is a one character string for terminating the transfer of the data over the general purpose bus 34.

The local unit may also transmit replies which may be observed on the teletype at the central station. Observation of ! indicates a transmission error, such as a parity error, an overrun for framing error. Observation of >> indicates a mode error whereby a string command was received in the immediate mode. Observation of # signifies an illegal command, such as an unassigned command, unequal characters or loss of carrier. Observation of $ indicates that the assigned command is done, such as sampling or self-test. Observation % indicates fail, such as the sampler overloaded or the self-test failed.

Observation of & signifies service request, indicating that the general purpose bus needs service.

Each local unit has a unique address which allows more than one unit to share a single 1200 baud line to the central computer 12. A START I/O command signal followed by an address signal initiates a command sequence to the local unit addressed. The addressed local unit executes immediate commands immediately upon receipt without transmission errors. The string commands are stored in random access memory comprising microprocessor control means 24 and executed after receipt of an END I/O command signal.

Either an END I/O or CONDITIONAL END I/O command signal must terminate a command sequence before a different local unit may be addressed, the latter command signal not causing execution of string commands. Each local unit is in the immediate mode at the beginning of a command sequence. The START STRING command signal alerts the addressed local unit that string commands follow. The END STRING command signal returns the unit to the immediate mode.

There is set forth below a typical immediate command format indicating the exchanges between the central computer and the local unit.

| COMPUTER | GENERATOR LOCAL UNIT |
| --- | --- |
| START I/O | |
| ADDRESS | |
| | ADDRESS |
| LOAD WAVEFORM | |
| | LOAD WAVEFORM |
| MODEM | |
| | MODEM |
| 512 12-BIT WORDS | |
| CHECKSUM PARITY | |
| | ERROR STATUS WORD |
| START STRING | |
| | START STRING |
| LINE CONFIG. | |
| @ | |
| OUTPUT LEVEL | |
| J | |
| GENERATE | |
| @ | |
| END STRING | |
| | LINE CONFIG. |
| | @ |
| | OUTPUT LEVEL |
| | J |
| | GENERATE |
| | @ |
| | END STRING |
| END I/O | |
| | END I/O |
| START I/O | |
| ADDRESS | |
| | ADDRESS |
| START STRING | |
| | START STRING |
| LINE CONFIG. | |
| @ | |
| DELAY | |
| D | |
| ADJUST AGC | |
| SAMPLE | |
| END STRING | |
| | LINE CONFIG. |
| | @ |
| | DELAY |
| | D |
| | ADJUST AGC |
| | SAMPLE |
| | END STRING |
| END I/O | |
| | END I/O |
| START I/O | |
| ADDRESS | |
| | ADDRESS |
| SEND SAMPLES | |
| | SEND SAMPLES |
| MODEM | |
| | MODEM |
| | 512 12-BIT WORDS |
| | AGC SETTING |
| | CHECKSUM PARITY |
| END I/O | |
| | END I/O |

| | ERROR STATUS WORD |
| --- | --- |
| BIT 1 = | CHECKSUM PARITY ERROR |
| BIT 2 = | TRANSMISSION ERROR |
| BIT 3 = | TOO FEW CHARACTERS |
| BIT 4 = | TOO MANY CHARACTERS |
| BIT 5 = | 1 |
| BIT 6 = | 1 |
| BIT 7 = | 0 |
| BIT 8 = | ODD PARITY |

It is evident that those skilled in the art may enter a sequence of these steps in a program register so that testing of a line may be rapidly initiated by identifying the local units and specifying the tests to be made.

Figure 3A:
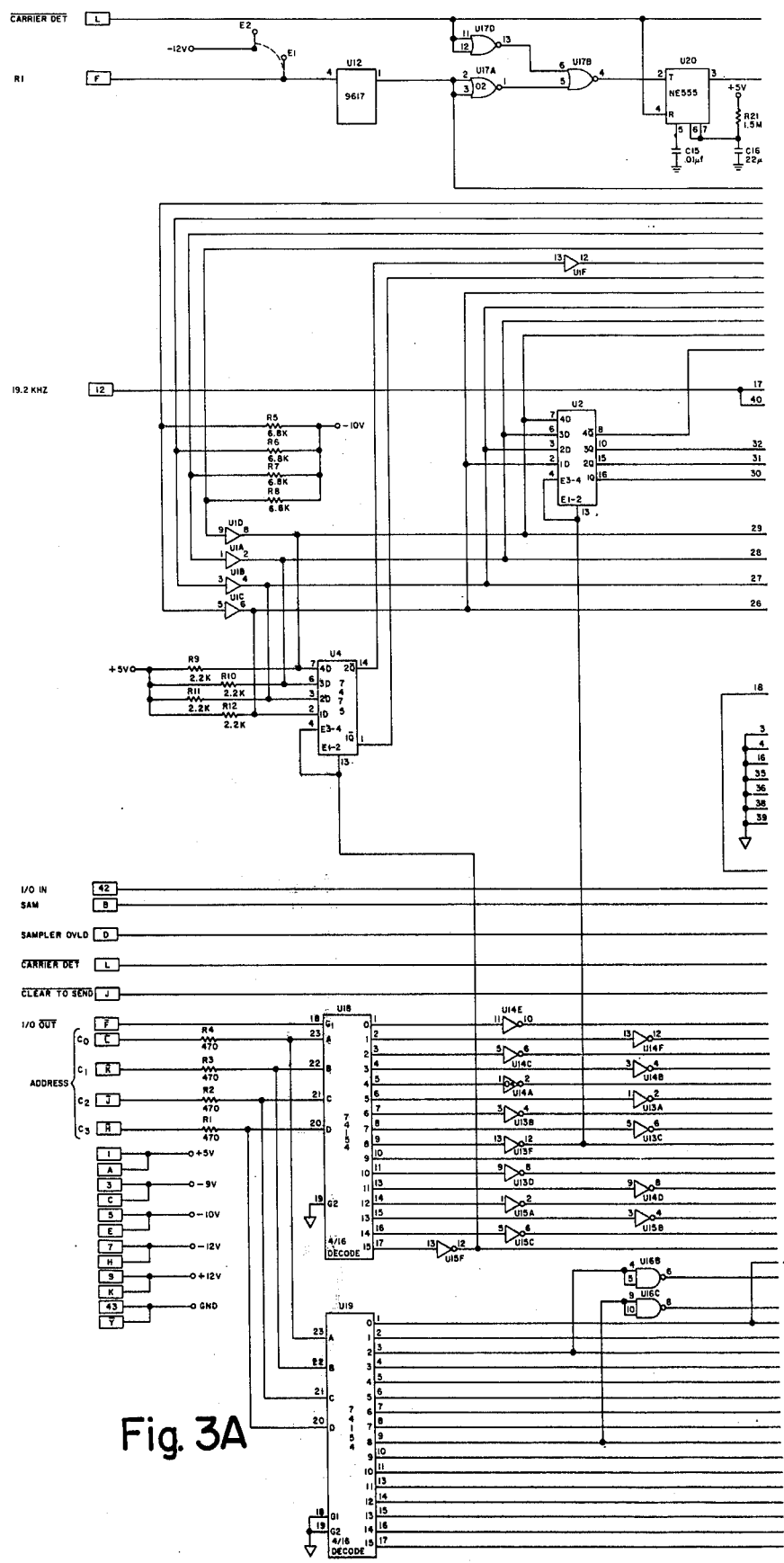
FIGS. 3A and 3B are left and right halves, respectively, of a combined block-schematic circuit diagram illustrating the logical arrangement of an input-output board.
Figure 3B:
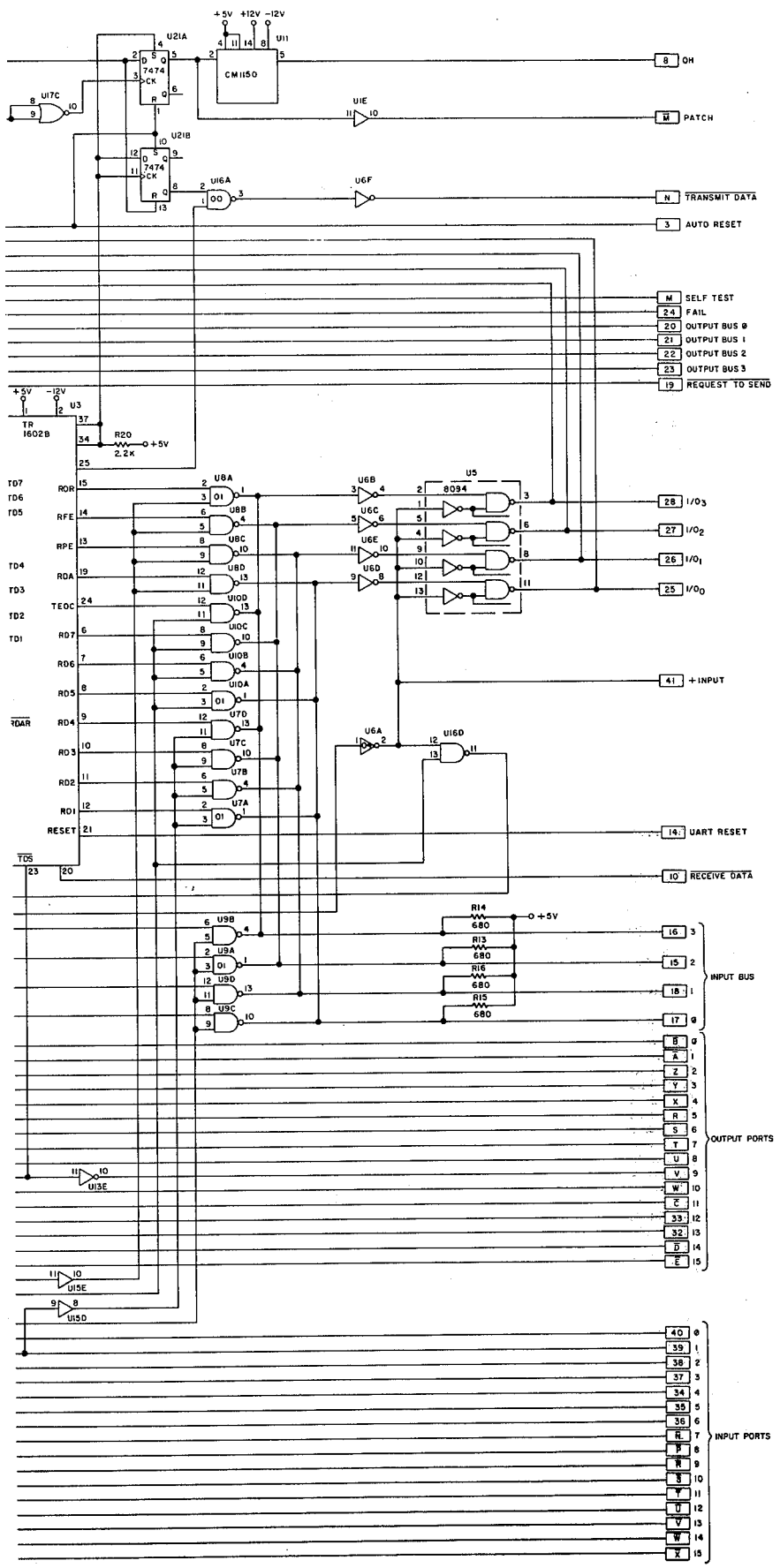
Figure 4A:
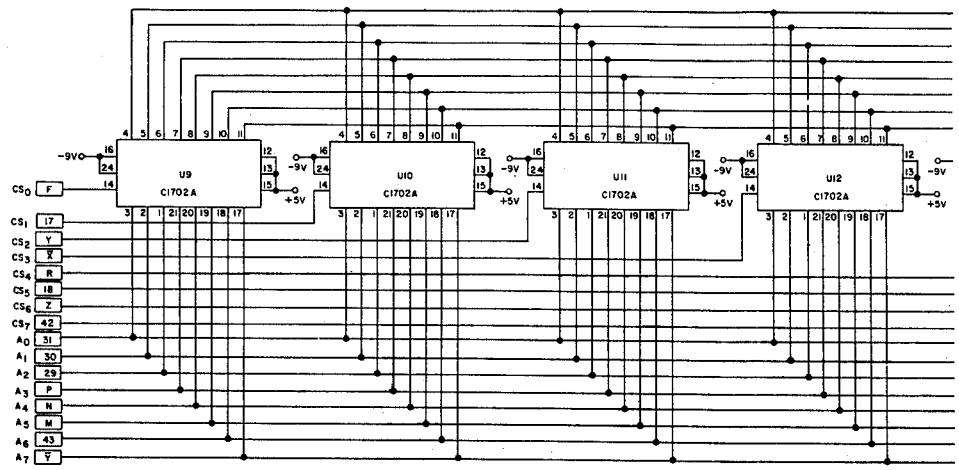
FIGS. 4A and 4B are left and right halves, respectively, of a combined block-schematic circuit diagram illustrating the logical arrangement of a memory board.
Figure 4A:
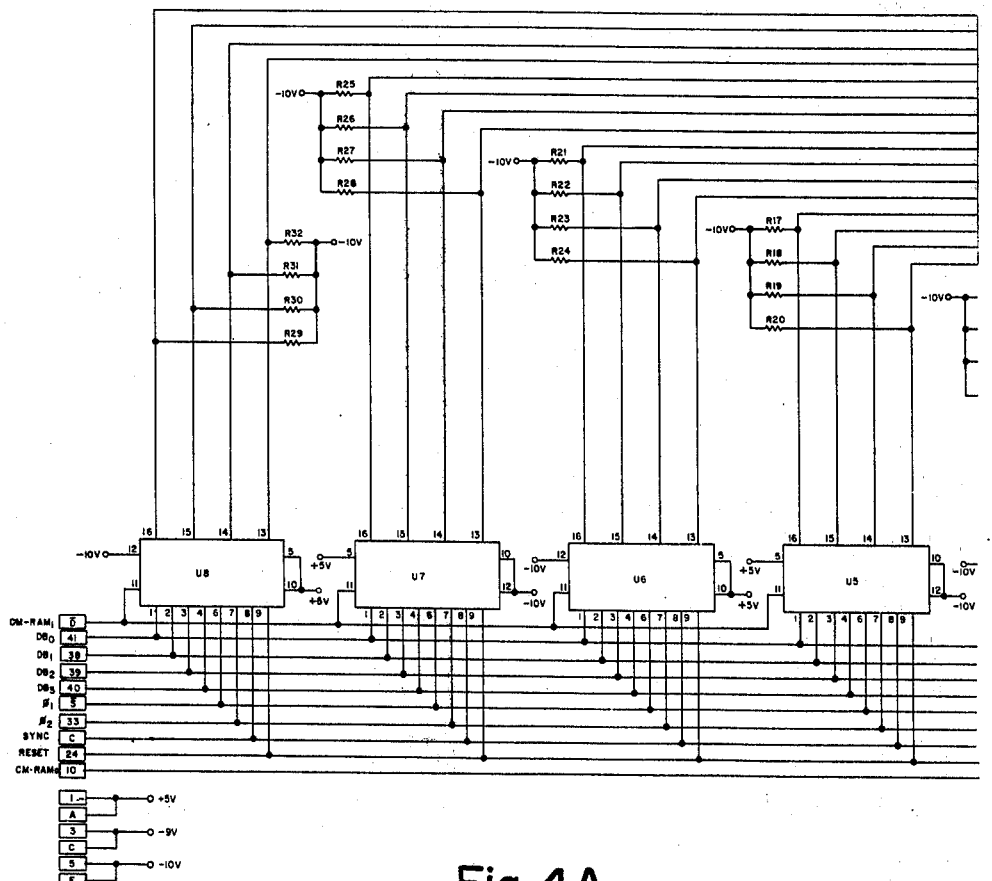
Figure 4B:
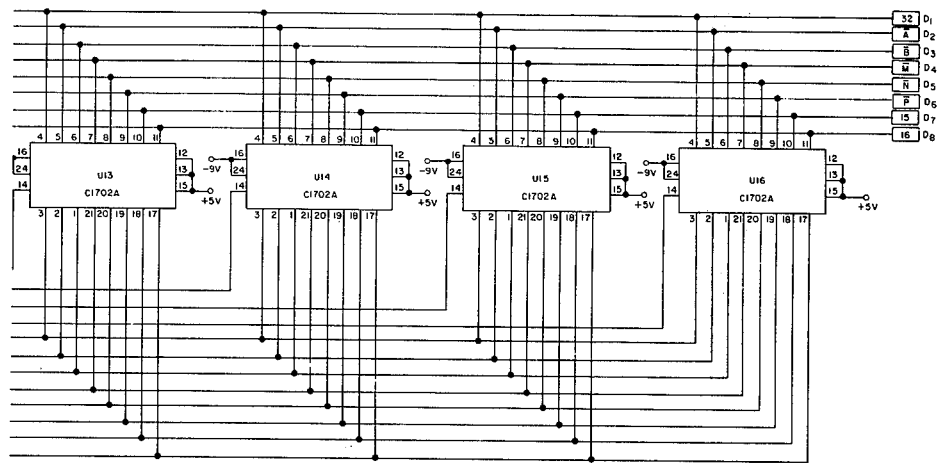
Figure 5A:
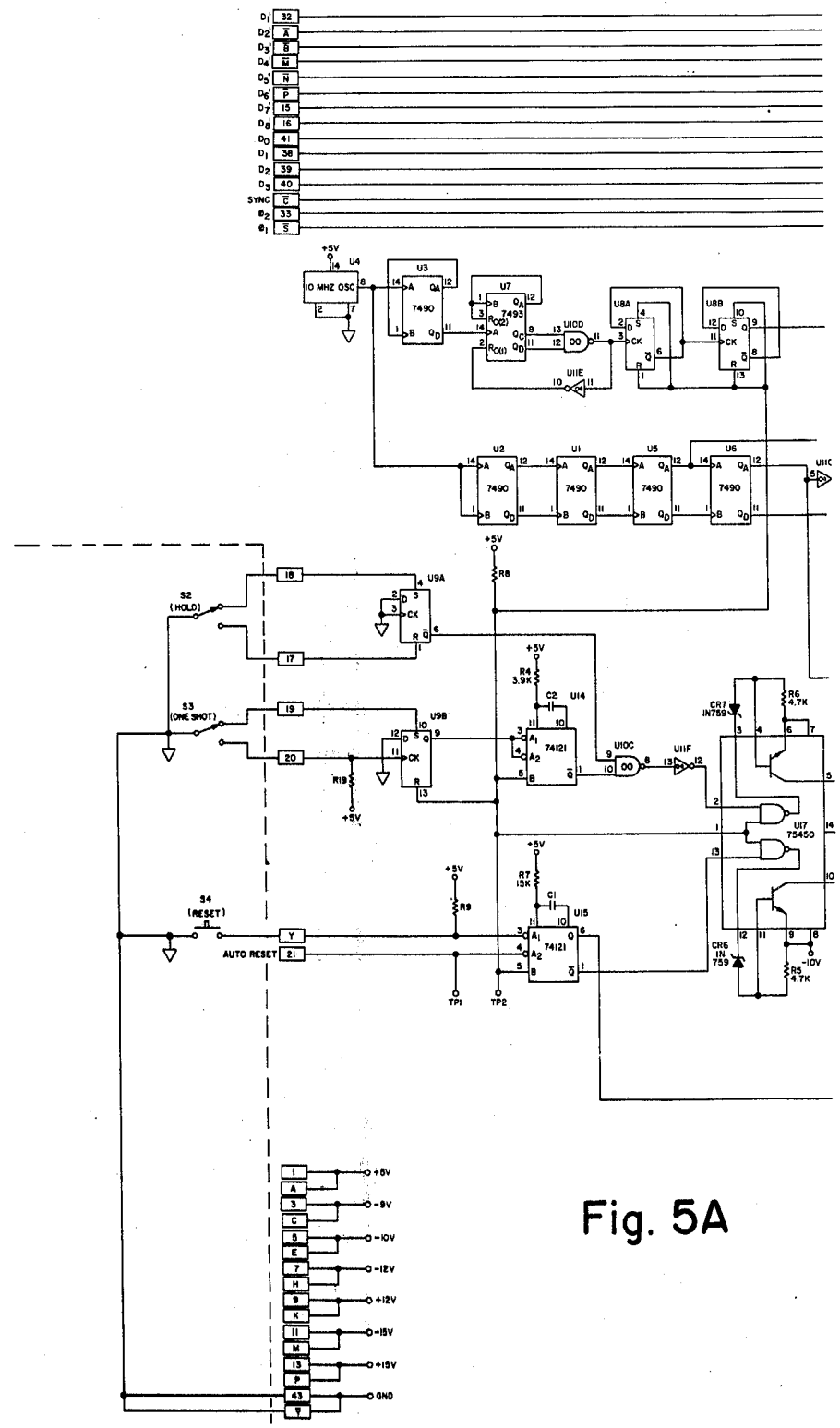
FIGS. 5A and 5B are left and right halves, respectively, of a combined block-schematic circuit diagram illustrating the logical arrangement of a control board.
Figure 5B:
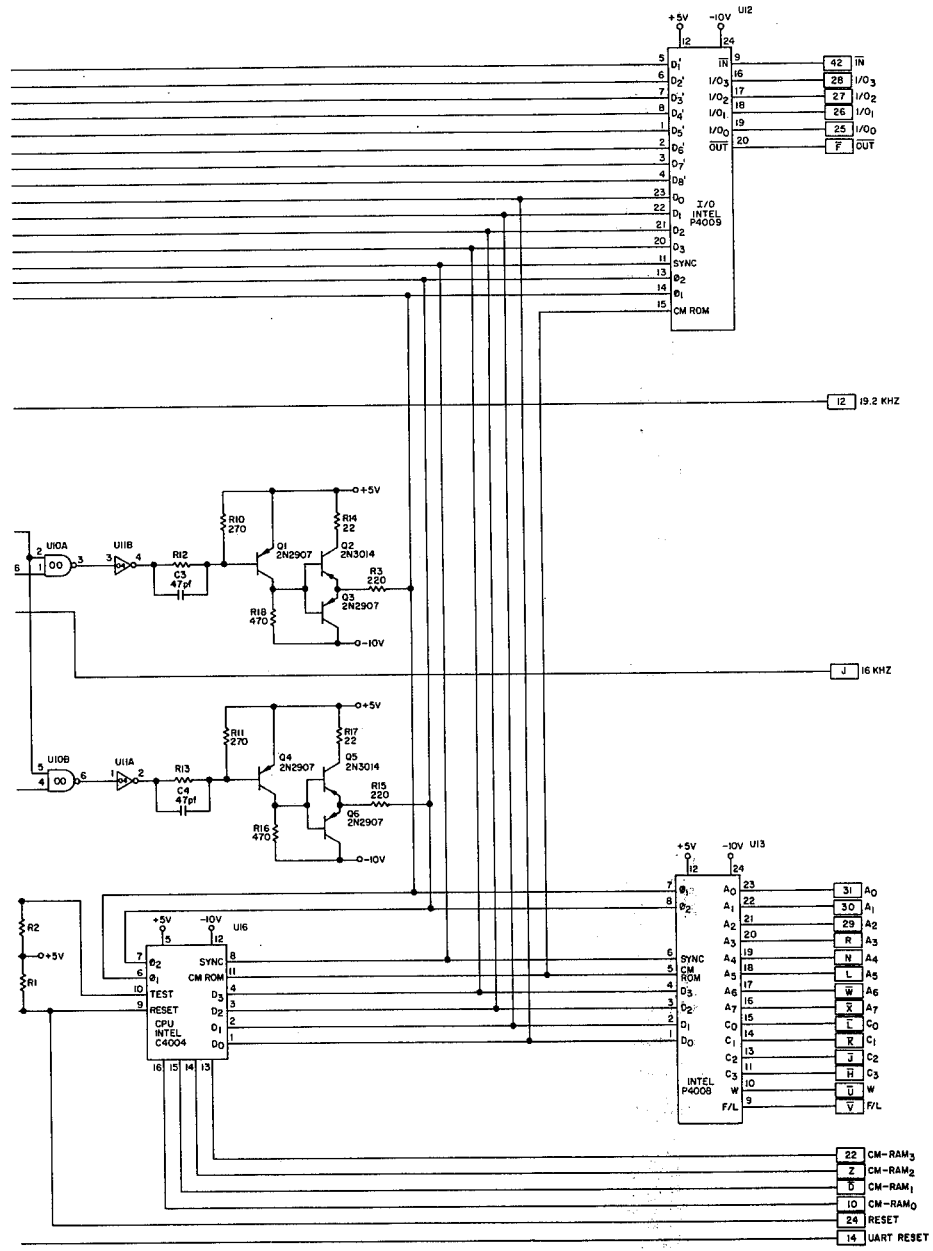
Figure 6A:
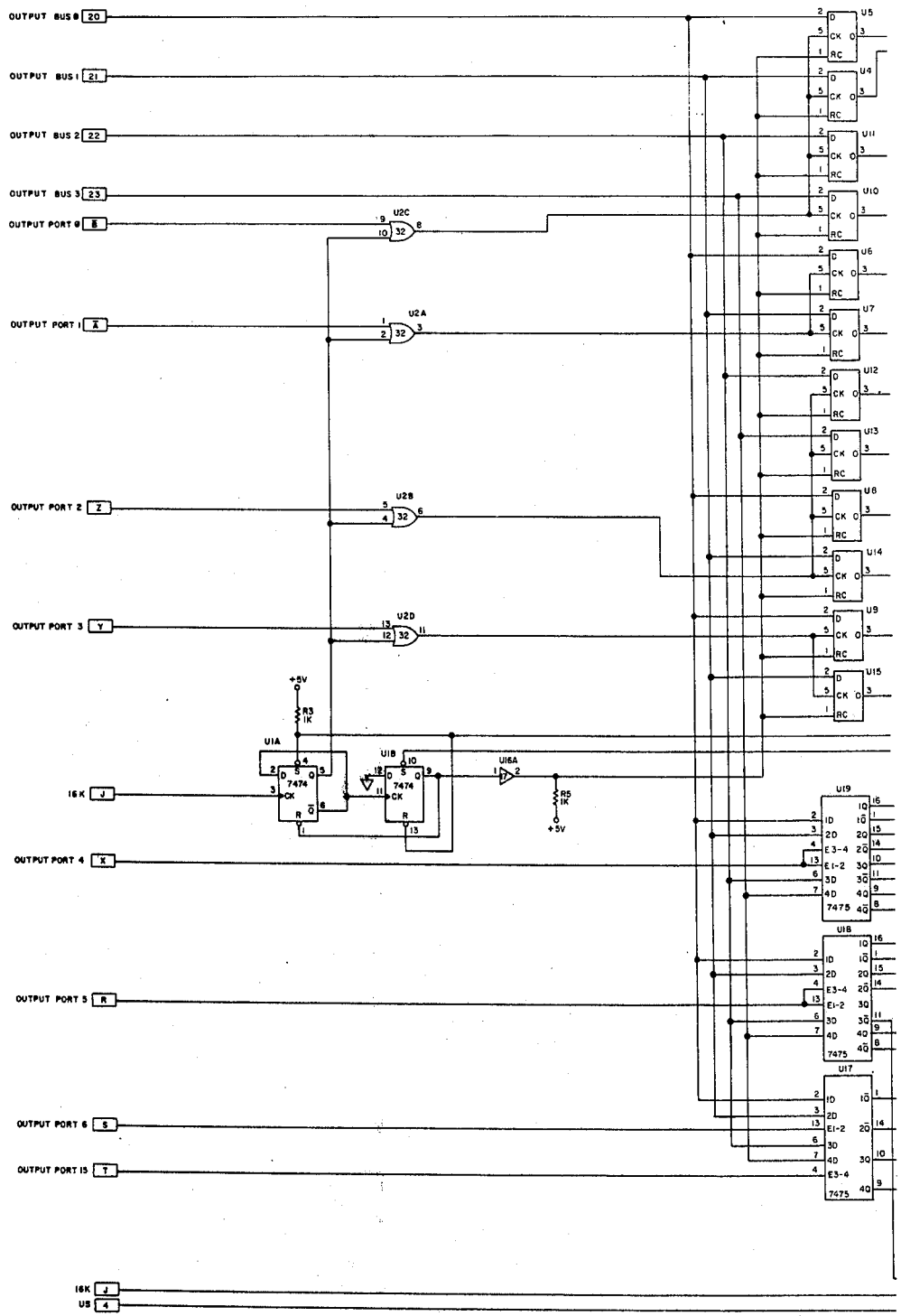
FIGS. 6A and 6B are left and right halves, respectively, of a combined block-schematic circuit diagram illustrating the logical arrangement of a signal generator.
Figure 6B:
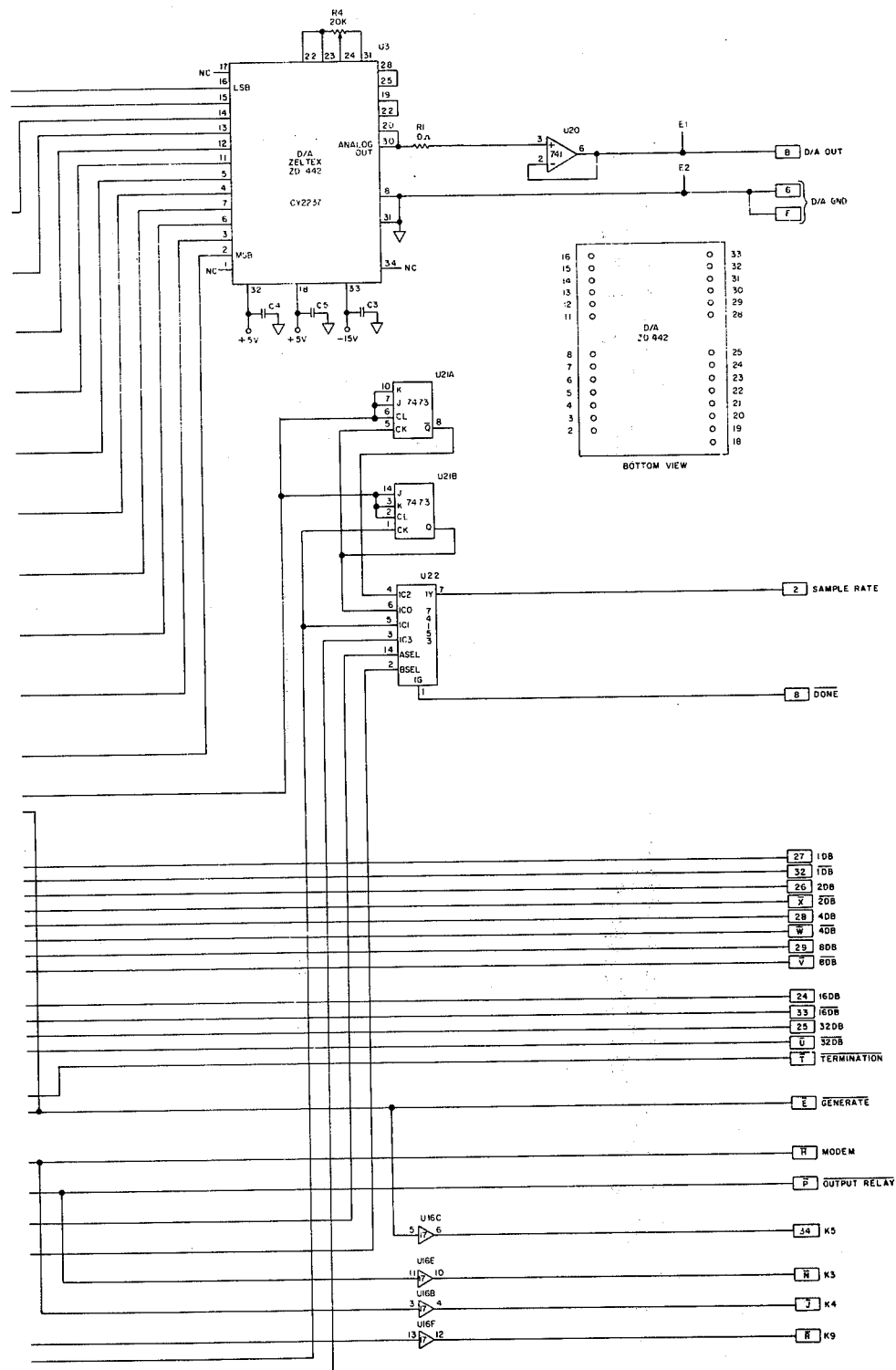
Figure 7A:
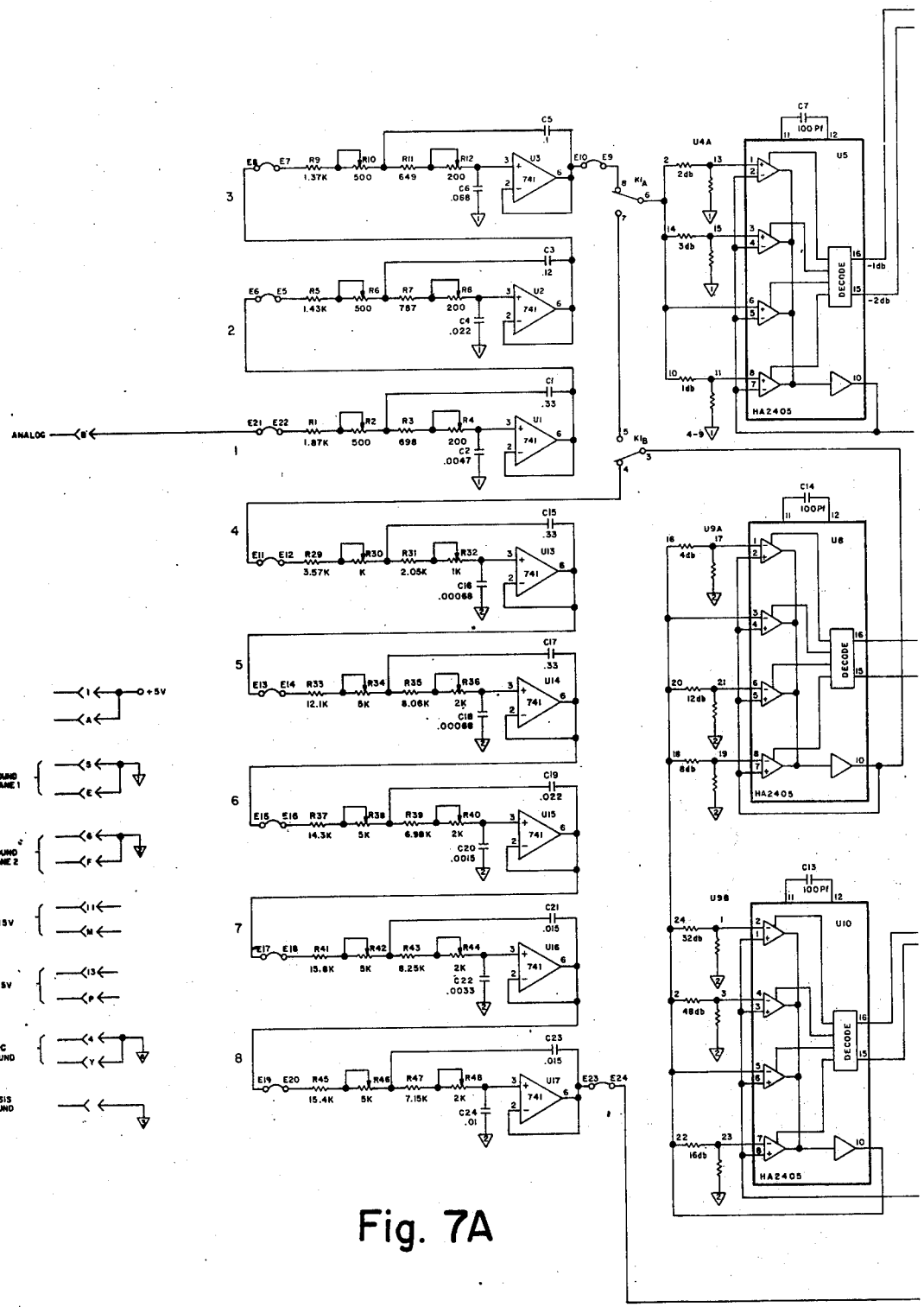
FIGS. 7A and 7B are left and right halves, respectively, illustrating the logical arrangement of an analog board.
Figure 7B:
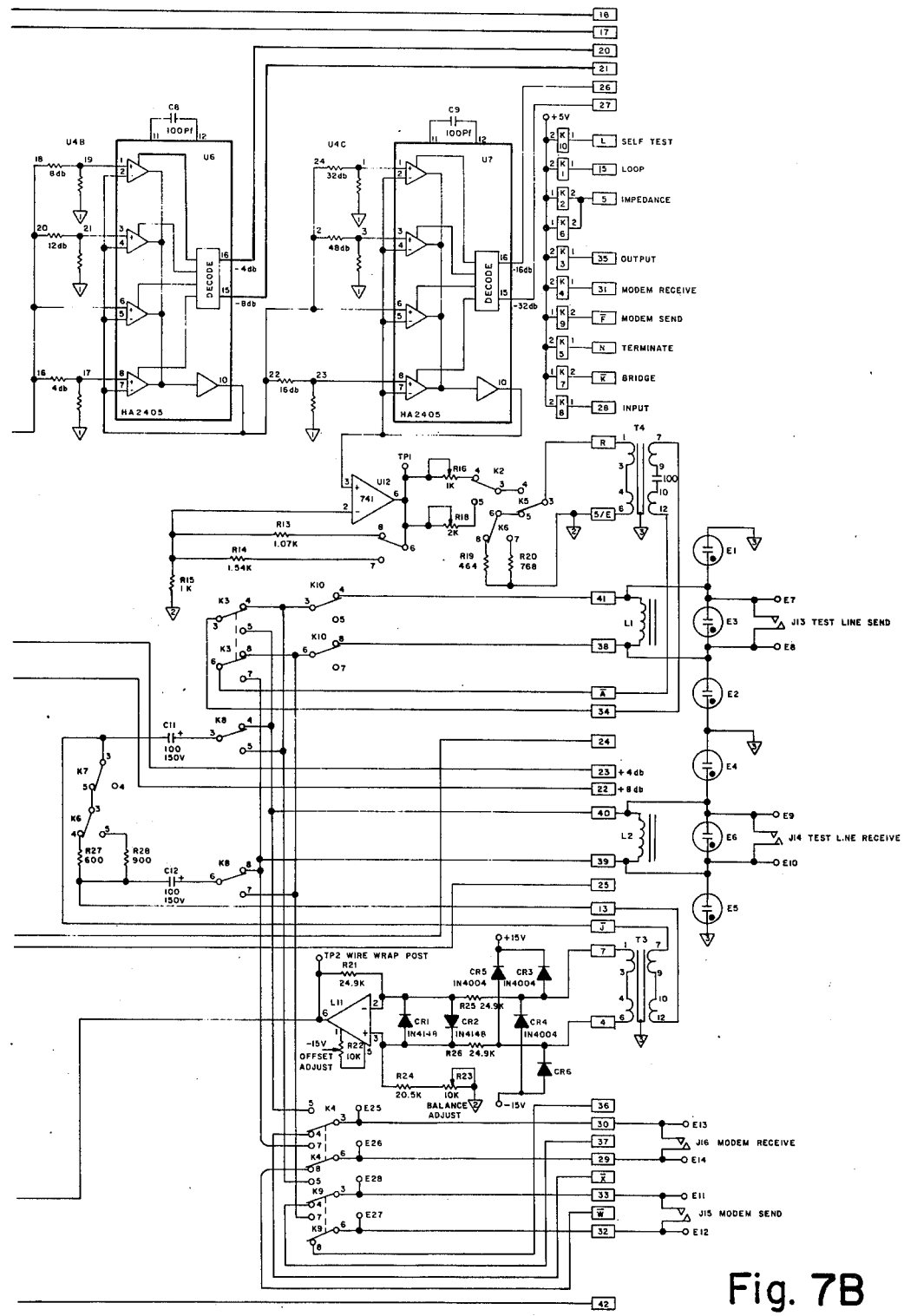
Figure 8A:
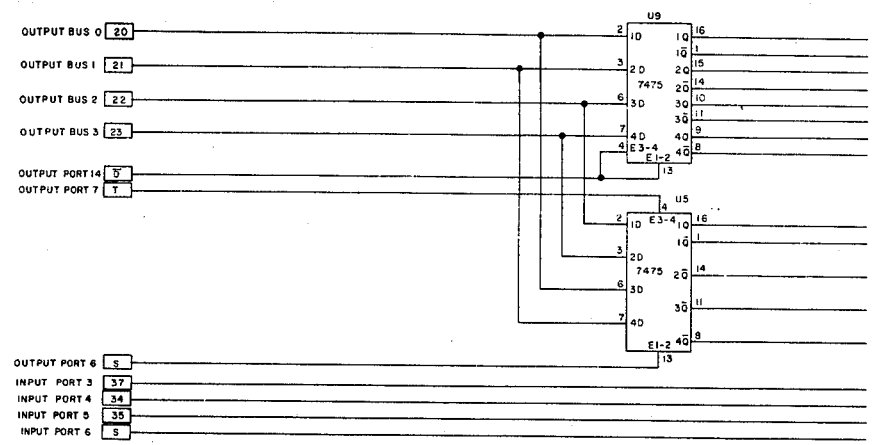
FIGS. 8A and 8B are left and right halves, respectively, of a signal receiver.
Figure 8A:
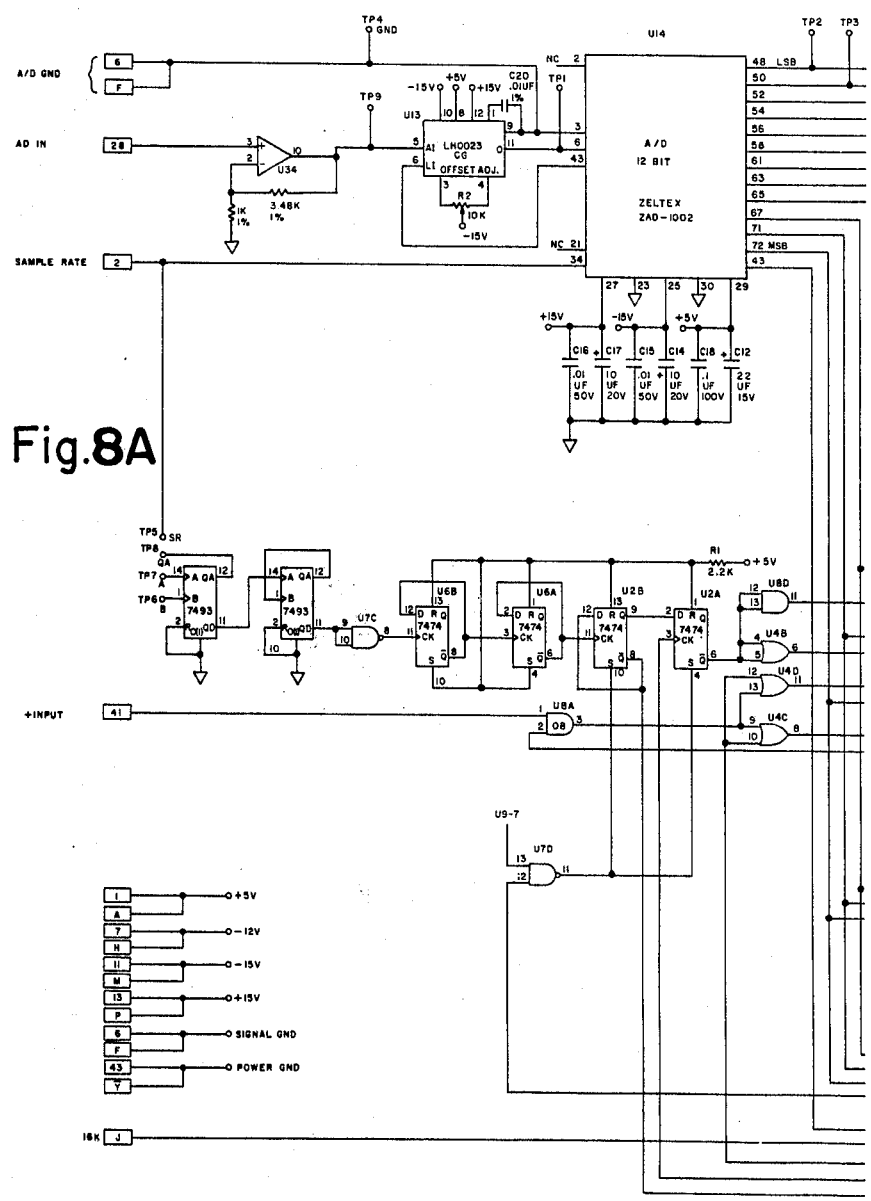
Figure 8B:
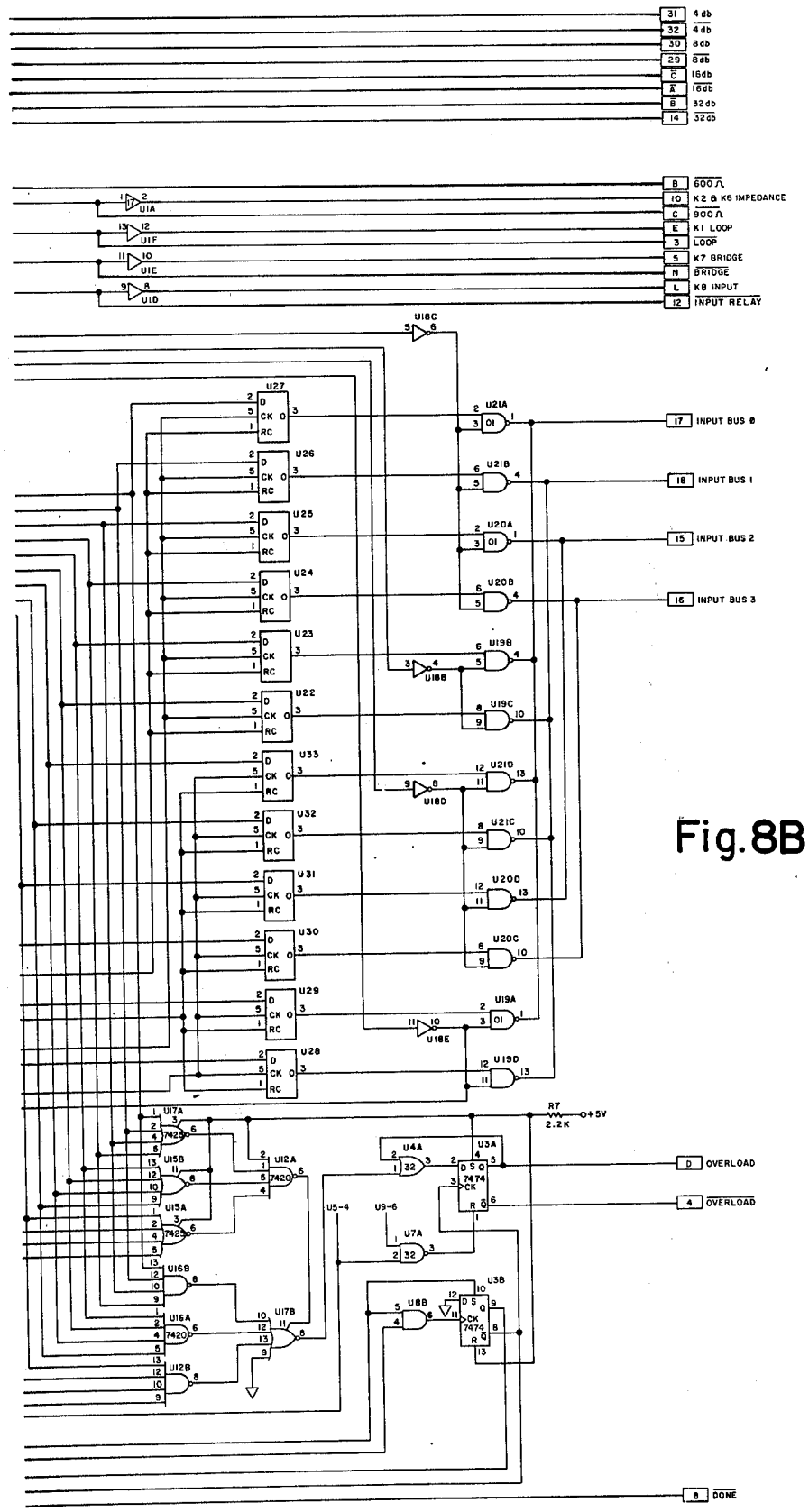

The above description of a specific embodiment is by way of example for illustrating the best mode now contemplated for practicing the invention and is sufficient to enable anyone having ordinary skill in the art to practice it. The application as filed included diagrams of an actual working unit and the detailed steps in the program carried by microprocessor control means 24. The modem 23 in this unit is a Sanders 12/18 AC modem commercially available from Sanders Associates in Nashua, N.H. The diagram shown in FIGS. 3A and 3B is the portion of microprocessor control means 24 that interfaces with the rest of the system. The diagram shown in FIGS. 4A and 4B is the memory portion of microprocessor control means 24. The diagram shown in FIGS. 5A and 5B is the control portion of microprocessor control means 24. The diagram shown in FIGS. 6A and 6B is the generator buffer 25 and the digital-to-analog converter portion of D/A converter 26. The diagram shown in FIGS. 7A and 7B is the filter and output level controller 27, line interfaced 30 and input filter and level controller 31. The diagram shown in FIGS. 8A and 8B is the analog-to-digital converter 32 and receiver buffer 33.

The application as filed included 19 pages of program steps in a printout of the steps stored in the read-only memory portion of microprocessor control means 24. The first column carries the program step address, the second column carries the binary encoded step and the third column identifies the step in accordance with codes explained in the commercially available Itel manual for programming the read-only memory in the commercially available Itel microprocessor used in the unit.

The invention has a number of features. The concept of having one or more local programmable units communicating with a central digital computer affords great flexibility in testing at relatively low system cost reliably over relatively inexpensive communication channels to rapidly effect a wide number of tests. The local unit includes a digital input/output for communicating with a digital computer and an analog input/output for communication with a line under test. To this end it includes a shift register waveform generator that may receive a sequence of multi-bit digital numbers representative of a waveform serially at a relatively slow rate and provide these digital number signals in sequence in parallel form to a digital-to-analog converter to produce the desired test analog signal as the shift register is shifted at a much faster rate than the rate at which waveform data may enter. A similar unit may be used for accepting a digital representation of a received signal waveform and delivering it at a slower rate for transmission to the central office digital computer.

Still another feature of the specific embodiment resides in controlling the input signal level so as to maximize the digital resolution of the received input signal. Still another feature of the invention is the ability of each local unit to function as either or both of transmitters and receivers.

Still another feature of the invention is the use of immediate commands and string commands. By sending the immediate command twice, each local unit is almost certain of having received the correct command because the failure to indicate a compare of successive immediate commands may be used to prevent execution of the immediate command and cause transmission of an error signal to the central computer. By transmitting back to the central computer every command, the central computer may be programmed to prohibit execution of string commands unless the received string commands compare with the transmitted string commands. The waveform designations may be sent once while using conventional error checking techniques.

It is apparent that those skilled in the art may now make numerous uses and modifications of and departures from the specific embodiments and techniques herein disclosed without departing from the principles of the invention. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for measuring characteristics of a communication channel comprising, means defining a communication channel for exchanging information signals between the ends of the communication channel, means defining a programmable local unit at one end of said communication channel for exchanging signals with said communication channel, central digital computing means for exchanging digital signals with said programmable local unit, means defining a communications link between said digital computing means and said programmable local unit for exchanging digital data signals therebetween, said programmable local unit including means responsive to the digital signals from said digital computing means for providing an analog signal waveform for transmission over said communication channel and means responsive to the received test analog signal transmitted over said communication channel for converting the received analog signal into a representative digital signal that is transmitted to said digital computing means to enable the latter to determine transmission characteristics of said communication channel.

2. Apparatus for measuring characteristics of a communication channel in accordance with claim 1 and further comprising, a second said programmable local unit at the other end of said communication channel, and means defining a second communications link between said central digital computing means and said second programmable local unit for exchanging digital signals therebetween, one of said programmable local units being for receiving command signals from said digital computing means to generate an analog test signal for transmission over said communication channel to the other of said local programmable units, said other local programmable unit being for receiving digital command signals from said digital computing means for transmitting digital signals to said digital computing means representative of the received test analog signal after transmission over said communication channel.

3. Apparatus for measuring characteristics of a communication channel in accordance with claim 1 wherein said local programmable unit includes means for controlling the level of said analog signal waveform for transmission over said communication channel.

4. Apparatus for measuring characteristics of a communication channel in accordance with claim 1 wherein said local programmable unit includes means for controlling the level of said received analog signal.

5. Apparatus for measuring characteristics of a communication channel in accordance with claim 1 wherein said means for providing an analog signal waveform comprises buffer means for storing a sequence of digital byte signals representative of said analog signal waveform at a first rate, digital-to-analog converting means, and means for providing the digital byte signals stored in said buffer means at a second rate to said digital-to-analog converting means to provide the latter analog signal waveform.

6. Apparatus for measuring the characteristics of a communication channel in accordance with claim 5 wherein said means for converting said received test analog signal comprises, analog-to-digital converting means for providing a digital representation of said received test analog signal, receiver buffer means responsive to the latter digital representation for storing a sequence of digital byte signals representative of said received analog signal waveform at said second rate, and means of transmitting the latter stored sequence of digital byte signals at said first rate to said digital computing means.

7. Apparatus for measuring characteristics of a communication channel in accordance with claim 1 wherein said means for converting said received test analog signal comprises, analog-to-digital converting means for providing a digital repesentation of said received test analog signal, buffer means responsive to the latter digital representation for storing a sequence of digital byte signals representative of said received analog signal waveform at a second rate, and means for transmitting the latter stored sequence of digital byte signals at a first rate different from said second rate to said digital computing means.

8. A method of using the apparatus of claim 1 which method includes the steps of transmitting immediate command signals to said progammable local unit for execution immediately upon receipt, transmitting a string of command signals to said local programmable unit for storage and later execution, and transmitting to said local programmable unit an end of commands signal for causing said local programmable unit to execute the sequence of string commands represented by the string command signals previously stored therein.

9. A programmable local unit for exchanging digital signals with a central computer and analog signals with a communication channel whose characteristics are to be measured comprising, means responsive to digital signals provided by a digital computer for providing an analog signal waveform for transmission over said communication channel, and means responsive to the received test analog signal transmitted over said communication channel for converting the received analog signal into a representative digital signal for transmission to said digital computer.

10. A local programmable unit in accordance with claim 9 and further comprising means for controlling the level of said analog signal waveform for transmission over said communication channel.

11. A local programmable unit in accordance with claim 9 and further means for controlling the level of said received analog signal.

12. A local programmable unit in accordance with claim 9 wherein said means for providing an analog signal waveform comprises generator buffer means for storing a sequence of digital byte signals representative of said analog signal waveform provided by said digital computer at a first rate, digital-to-analog converting means, and means for providing the digital byte signals stored in said generator buffer means at a second rate to said digital-to-analog converting means to provide the latter analog signal waveform, receiving analog-to-digital converting means for providing a digital representation of said received test analog signal, receiver buffer means responsive to the latter digital representation for storing a sequence of digital byte signals representative of said analog signal waveform at said second rate, and means for providing the latter stored sequence of digital byte signals at said first rate for transmission to said digital computer.

13. A method of using the apparatus of claim 9 which method includes the steps of adjusting the level of said received analog signal so that the digital representation of the maximum amplitude thereof corresponds substantially to the largest magnitude digital number said receiving analog-to-digital converting means may represent.

* * * * *